United States Patent
Cho et al.

(10) Patent No.: US 8,875,024 B2
(45) Date of Patent: Oct. 28, 2014

(54) METHOD OF MANIPULATING MEDIA OBJECT IN MEDIA PLAYER AND APPARATUS THEREFOR

(75) Inventors: Kyung-sun Cho, Seoul (KR); Jeong-hoon Park, Seoul (KR); Sun-hee Youm, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1219 days.

(21) Appl. No.: 12/167,633

(22) Filed: Jul. 3, 2008

(65) Prior Publication Data

US 2009/0113302 A1 Apr. 30, 2009

(30) Foreign Application Priority Data

Oct. 24, 2007 (KR) .................. 10-2007-0107441

(51) Int. Cl.
*G06F 3/00* (2006.01)
*G11B 17/22* (2006.01)

(52) U.S. Cl.
CPC .......... *G11B 17/228* (2013.01); *Y10S 715/972* (2013.01)
USPC .......... 715/723; 715/716; 715/719; 715/720; 715/726; 715/756; 715/861; 715/972

(58) Field of Classification Search
CPC ..... G06F 3/048; G06F 3/0484; G06F 3/0481; G06F 3/04812; G06F 3/01; G06F 17/30781; G06F 17/30855; G06F 17/30849
USPC ......... 715/716, 719, 720, 723, 726, 756, 861, 715/972
See application file for complete search history.

(56) References Cited

U.S. PATENT DOCUMENTS

| | | | | |
|---|---|---|---|---|
| 4,905,077 A * | 2/1990 | Ishii | ............... | 348/588 |
| 4,905,168 A * | 2/1990 | McCarthy et al. | ............ | 345/474 |
| 5,564,005 A * | 10/1996 | Weber et al. | .................. | 715/863 |
| 5,600,776 A * | 2/1997 | Johnson et al. | ............... | 715/733 |
| 5,754,808 A * | 5/1998 | Tanaka et al. | ................. | 715/763 |
| 6,057,856 A * | 5/2000 | Miyashita et al. | ............ | 345/633 |
| 6,295,380 B1 * | 9/2001 | Takahashi | ..................... | 382/240 |
| 6,563,512 B1 * | 5/2003 | Azami et al. | .................. | 345/619 |
| 6,621,939 B1 * | 9/2003 | Negishi et al. | ................ | 382/291 |
| 6,856,427 B1 * | 2/2005 | Gilman et al. | ................. | 358/1.9 |

(Continued)

FOREIGN PATENT DOCUMENTS

JP 2001160154 A * 6/2001 ............. G06T 15/70
KR 10-1998-071844 A 10/1998

(Continued)

OTHER PUBLICATIONS

Office Action dated Nov. 28, 2013, issued by the Korean Intellectual Property Office in counterpart Korean Application No. 10-2007-0107441.

*Primary Examiner* — Shen Shiau
(74) *Attorney, Agent, or Firm* — Sughrue Mion, PLLC

(57) ABSTRACT

Provided is a method for manipulating a media object in a media player and an apparatus using the same. The method includes generating a rendering map for managing a region of a media object in a rendering interface according to time, receiving a user input via the rendering interface; updating the rendering map based on a user input; re-composing a scene based on the updated rendering map, and rendering the media object according to the re-composed scene.

17 Claims, 6 Drawing Sheets

(56) References Cited

U.S. PATENT DOCUMENTS

| | | | |
|---|---|---|---|
| 7,281,200 B2* | 10/2007 | Haskell et al. | 715/201 |
| 7,336,280 B2* | 2/2008 | Nelson et al. | 345/473 |
| 7,539,563 B2* | 5/2009 | Yang et al. | 701/24 |
| 7,574,407 B2* | 8/2009 | Carro et al. | 705/59 |
| 7,580,986 B2* | 8/2009 | Bugaj | 709/214 |
| 7,917,546 B2* | 3/2011 | Youm | 707/803 |
| 7,999,849 B2* | 8/2011 | Neff et al. | 348/155 |
| 2001/0030647 A1* | 10/2001 | Sowizral et al. | 345/420 |
| 2002/0152233 A1 | 10/2002 | Cheong et al. | |
| 2002/0163501 A1* | 11/2002 | Brouard et al. | 345/156 |
| 2002/0168086 A1* | 11/2002 | Sugahara | 382/100 |
| 2003/0052910 A1* | 3/2003 | Shiiyama | 345/719 |
| 2004/0006509 A1* | 1/2004 | Mannik et al. | 705/14 |
| 2004/0012621 A1* | 1/2004 | Kaneko et al. | 345/716 |
| 2004/0027369 A1* | 2/2004 | Kellock et al. | 345/716 |
| 2004/0054965 A1* | 3/2004 | Haskell et al. | 715/501.1 |
| 2005/0188310 A1 | 8/2005 | Dideriksen et al. | |
| 2005/0223034 A1* | 10/2005 | Kaneko et al. | 707/104.1 |
| 2006/0010153 A1* | 1/2006 | Bugaj | 707/102 |
| 2006/0050086 A1* | 3/2006 | Ono | 345/629 |
| 2007/0268406 A1* | 11/2007 | Bennett | 348/565 |
| 2008/0063114 A1* | 3/2008 | Joung et al. | 375/298 |
| 2008/0240669 A1* | 10/2008 | Oh et al. | 386/46 |
| 2009/0024963 A1* | 1/2009 | Lindley et al. | 715/839 |
| 2009/0043816 A1* | 2/2009 | Youm | 707/104.1 |
| 2009/0280898 A1* | 11/2009 | Izumi | 463/30 |
| 2010/0026682 A1* | 2/2010 | Plowman et al. | 345/419 |
| 2010/0177104 A1* | 7/2010 | Dufour et al. | 345/522 |

FOREIGN PATENT DOCUMENTS

| | | |
|---|---|---|
| KR | 10-2002-0080594 A | 10/2002 |
| KR | 10-0582549 B1 | 5/2006 |
| KR | 10-2006-0066906 A | 6/2006 |
| WO | 01/31497 A1 | 5/2001 |
| WO | 2006/036901 A1 | 4/2006 |

* cited by examiner

FIG. 2

| IDENTIFIER | PRIORITY ORDER | REGION | CLIPPING REGION |
|---|---|---|---|
| 0x11 | 5 | (20,50),(80,120) | (-,-)(-,-) |
| 0x12 | 2 | (x2,y2),(x2',y2') | (cx2,cy2),(cx2',cy2') |
| 0x14 | 1 | (x3,y3),(x3',y3') | (cx3,cy3),(cx3',cy3') |
| 0x20 | 8 | (x4,y4),(x4',y4') | (cx4,cy4),(cx4',cy4') |
| ... | ... | ... | ... |

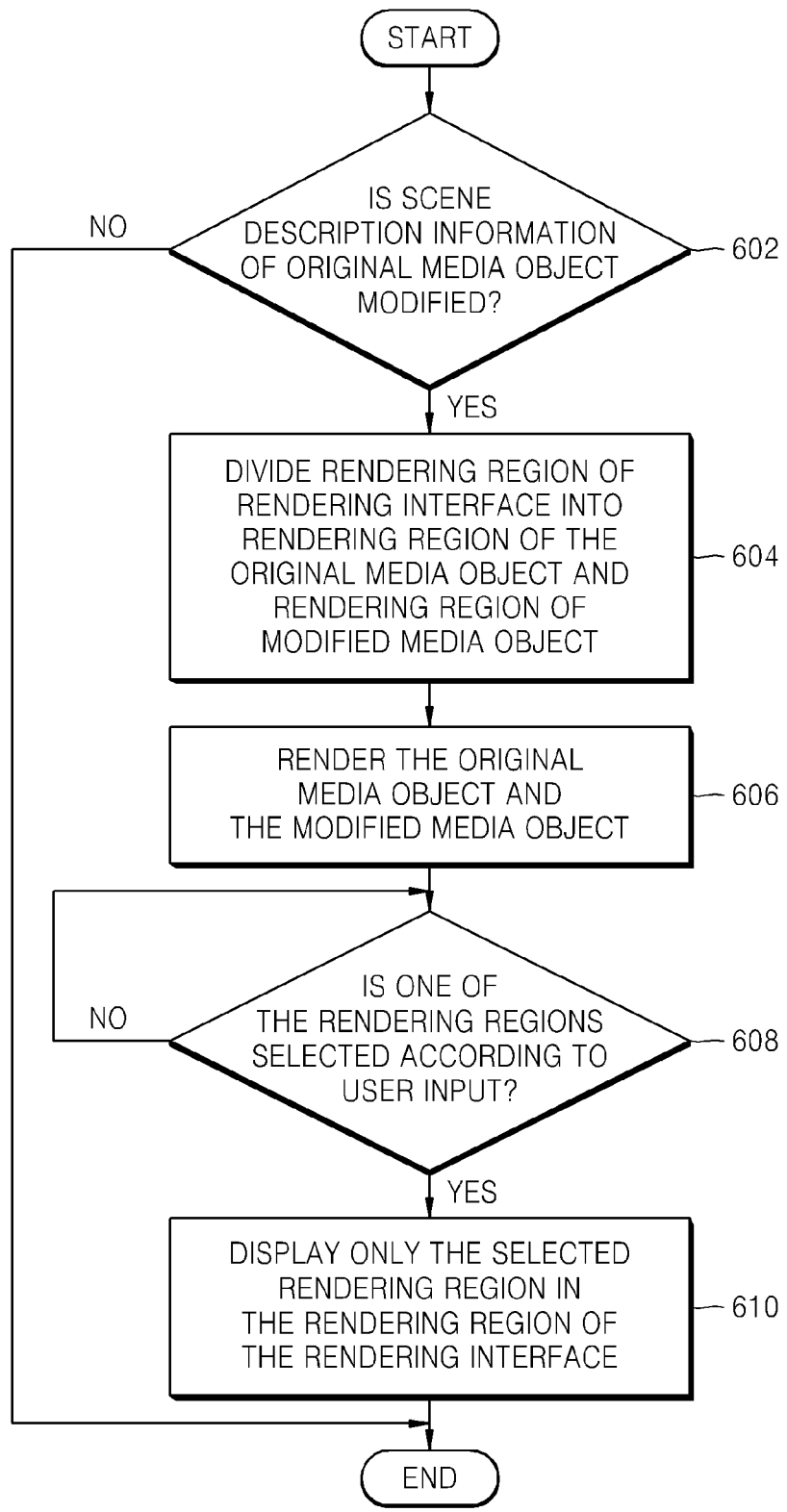

METHOD OF MANIPULATING MEDIA OBJECT IN MEDIA PLAYER AND APPARATUS THEREFOR

CROSS-REFERENCE TO RELATED PATENT APPLICATION

This application claims priority from Korean Patent Application No. 10-2007-0107441, filed on Oct. 24, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to manipulating a media object in a media player, and more particularly, to allowing a user to easily manipulate a media object via a rendering interface while content is being reproduced in a media player.

2. Description of the Related Art

Due to development of multimedia technologies, research has been actively conducted with the aim of satisfying various user demands related to content. Accordingly, there is an increasing demand for users themselves to directly produce contents.

In general, a media file format is composed of media objects separated based on a track. Here, the media object represents an object such as an audio frame, a video frame, or an image frame which content is comprised of. The track represents a channel in which the media objects are continuously flowing.

A problem exists regarding related art media player framework for reproducing a media file in that it does not provide a structure by which a user can manipulate content while the content is being reproduced. A bi-directional user interface provided by a Moving Picture Experts Group-4 (MPEG-4) system (ISO/IEC 14496-1, 11) does not provide a structure for directly manipulating a media object (or metadata thereof but only enables a part of previously authored content to be reproduced.

Also, the related art media player framework only accesses a media object (e.g., YUV data) to which media decoding is completed and cannot access an encoded media object (e.g., JPG data). Thus, there is a problem because the encoded media object cannot be obtained during reproduction of the contents.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of manipulating a media object in a media player and an apparatus therefor which enable a user to select and manipulate the media object (or metadata thereof in real-time during reproduction of contents.

The present invention also provides a method of manipulating a media object in a media player and an apparatus therefor which can obtain an encoded media object in real-time during reproduction of contents.

The present invention also provides a method of manipulating a media object in a media player and an apparatus therefor which provide a user interface by which content is conveniently modified in the media player.

According to an aspect of the present invention, there is provided a method of manipulating a media object in a media player, the method comprising generating a rendering map for managing a region of the media object in a rendering interface according to time; receiving a user input via the rendering interface; updating the rendering map based on the user input; re-composing a scene based on the updated rendering map; and rendering the media object according to the re-composed scene.

The rendering map may comprise at least one of an identifier, region information, priority order information, and attribute information, which are of the media object.

The operation of generating the rendering map may comprise generating the rendering map by using region information when scene description information about the media object includes the region information; and generating the rendering map using a value pre-determined by a user when the region information is not included in the scene description information.

Updating the rendering map may include updating at least one of the identifier, the region information, the priority order information, and the attribute information regarding the media object, based on an input time of the user input and a location of the rendering interface when the user input is received.

The rendering map may be managed using a data structure comprising a linked list according to the priority order information.

According to another aspect of the present invention, there is provided a method of manipulating a media object in a media player, the method comprising buffering an encoded media object; decoding the encoded media object; buffering the decoded media object; rendering the decoded media object; and temporarily storing the encoded media object while being decoded, buffered, and rendered.

According to another aspect of the present invention, there is provided a method of manipulating a media object in a media player, the method comprising, dividing a rendering region of the rendering interface into a rendering region of the original media object and a rendering region of a modified media object in response to scene description information about an original media object being modified according to a user input via a rendering interface; rendering the original media object in the rendering region of the original media object and rendering the modified media object in the rendering region of the modified media object; and according to a user input for selecting one of the rendering region of the original media object and the rendering region of the modified media object, displaying only the selected rendering region in the rendering region of the rendering interface.

According to another aspect of the present invention, there is provided an apparatus for manipulating a media object in a media player, the apparatus comprising a rendering interface which receives a user input; a rendering map management unit which generates a rendering map for managing a region of the media object in the rendering interface according to time, and updates the rendering map based on the user input received via the rendering interface; a scene composition unit which re-composes a scene based on the updated rendering map; and a renderer which renders the media object according to the re-composed scene.

According to another aspect of the present invention, there is provided an apparatus for manipulating a media object in a media player, the apparatus comprising a decoding buffer which buffers an encoded media object; a media decoder which decodes the encoded media object; a composition buffer which buffers the decoded media object; a renderer which renders the decoded media object; and an access buffer which receives the encoded media object from the decoding buffer and temporarily stores the encoded media object until the renderer completes rendering of the decoded media object.

According to another aspect of the present invention, there is provided a computer readable recording medium having recorded thereon a program for executing a method of manipulating the media object in a media player, the method comprising generating a rendering map for managing a region of the media object in a rendering interface according to time; receiving a user input via the rendering interface; updating the rendering map based on the user input; re-composing a scene based on the updated rendering map; and rendering the media object according to the re-composed scene.

BRIEF DESCRIPTION OF THE DRAWINGS

The above and other aspects of the present invention will become more apparent by describing in detail exemplary embodiments thereof with reference to the attached drawings in which:

FIG. 2 is a diagram illustrating an example of a rendering map generated and updated by a rendering map management unit of FIG. 1;

FIG. 6 is a flowchart of a method of manipulating a media object in a media player, according to another exemplary embodiment of the present invention.

DETAILED DESCRIPTION OF THE INVENTION

The present invention will now be described more fully with reference to the accompanying drawings, in which exemplary embodiments of the invention are shown.

Figure 1:
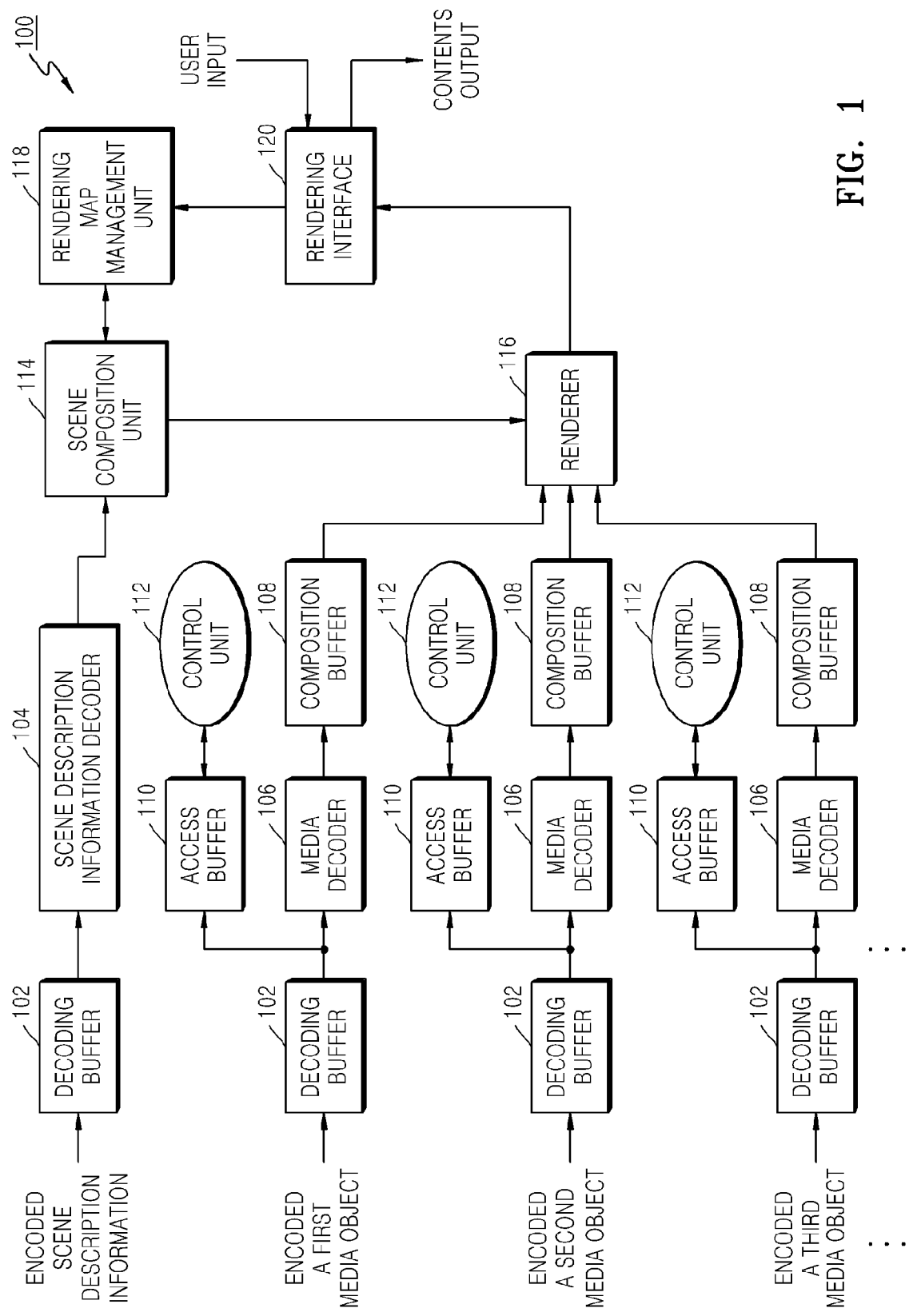
FIG. 1 is a block diagram of a media player including an apparatus for manipulating a media object according to an exemplary embodiment of the present invention.

FIG. 1 is a block diagram of a media player 100 including an apparatus for manipulating a media object according to an embodiment of the present invention. The media player 100 includes a decoding buffer 102, a scene description information decoder 104, a media decoder 106, a composition buffer 108, an access buffer 110, a control unit 112, a scene composition unit 114, a renderer 116, a rendering map management unit 118, and a rendering interface 120.

The media player 100 receives a media object and scene description information, which are encoded, from a server (not shown). The media object represents an object, such as an audio frame, a video frame, or an image frame, which includes content. The scene description information is for composing a scene based on object-based multimedia data. For example, in a Moving Picture Experts Group-4 (MPEG-4) system, a scene description language named Binary format for Scene (BIFS) and an object descriptor (known as OD) are used so as to compose the scene based on the object-based multimedia data.

Figure 3:
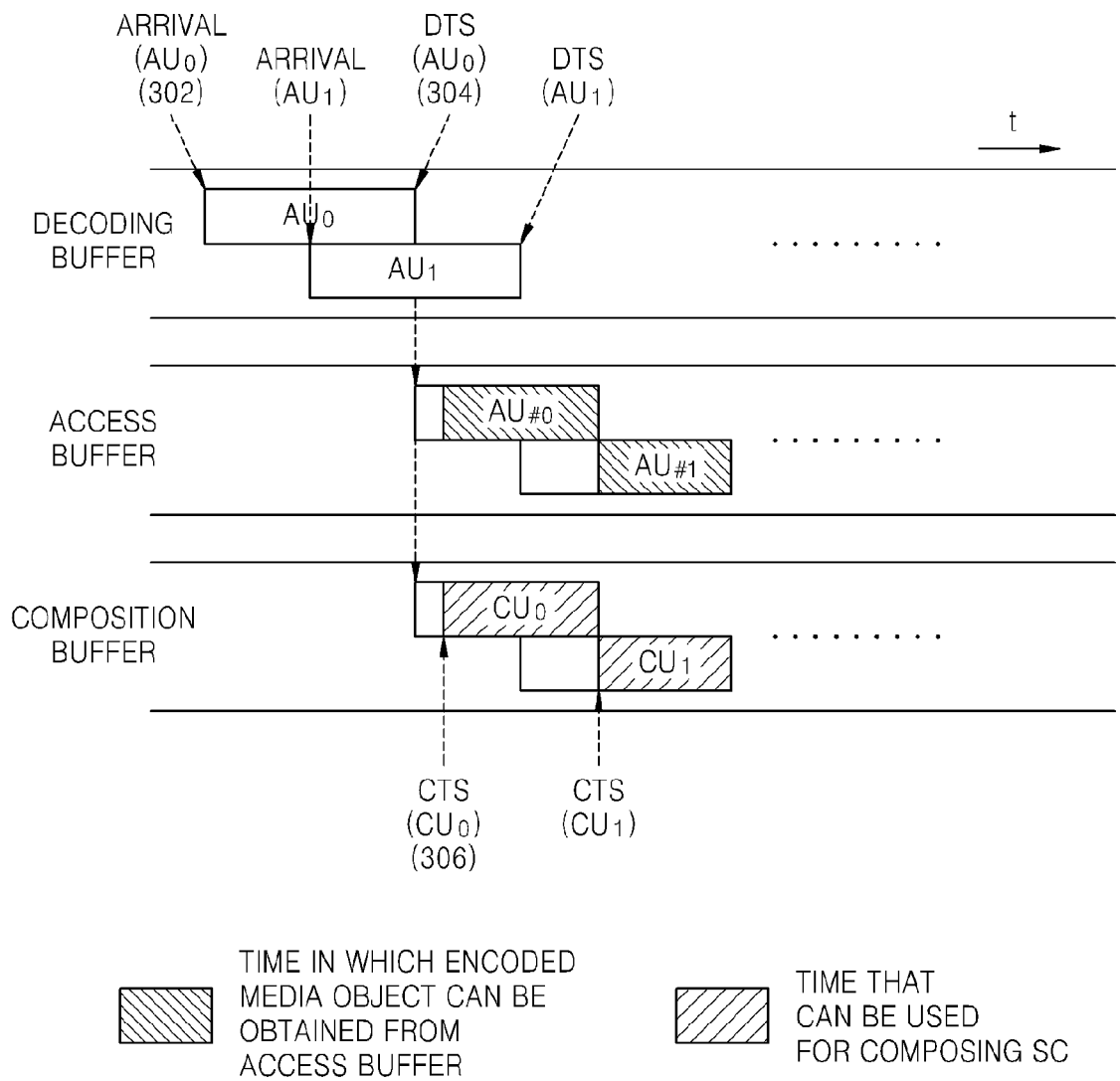
FIG. 3 is a diagram illustrating an example of a timing model related to an access buffer of FIG. 1.

The decoding buffer 102 buffers the encoded media object received by the media player 100. For example, referring to FIG. 3, the decoding buffer 102 receives Access Unit $(AU)_0$ or $AU_1$ at a time denoted as Arrival $(AU_0)$ 302 or Arrival $(AU_1)$. Here, the AU represents the encoded media object selected by a user via the rendering interface 120. The decoding buffer 102 outputs the $AU_0$ or the $AU_1$ to the media decoder 106 or the scene description information decoder 104 at a time denoted as Decoding Time Stamp (DTS) $(AU_0)$ 304 or DTS $(AU_1)$. Here, the DTS represents a time at which decoding of the encoded media object or the encoded scene description information is started by the media decoder 106 or the scene description information decoder 104. The $AU_0$ or the $AU_1$ stored in the decoding buffer 102 is output to the scene description information decoder 104 or the media decoder 106 and deleted.

The scene description information decoder 104 receives the encoded scene description information from the decoding buffer 102 and decodes the encoded scene description information.

The media decoder 106 receives the encoded media object from the decoding buffer 102 and decodes the encoded media object. For example, a video decoder may be a decoder which meets a H.263 standard, and an audio decoder may be a decoder which meets a G.723 standard.

The composition buffer 108 buffers the media object decoded by the media decoder 106. For example, referring to FIG. 3, the composition buffer 108 receives composition unit $(CU)_0$ or $CU_1$ from the media decoder 106 or the scene description information decoder 104 at the time denoted as the DTS $(AU_0)$ 304 or the DTS $(AU_1)$. In this case, a decoding time performed by the media decoder 106 and the scene information decoder 104 is assumed to be 0. The CU is the media object decoded by the scene description information decoder 104 or the media decoder 106, and is transmitted to the renderer 116 so as to be rendered. The composition buffer 108 outputs the $CU_0$ or the $CU_1$ to the renderer 116 at a time denoted as Composition Time Stamp (CTS) $(CU_0)$ 306 or CTS $(CU_1)$. The CTS represents a time at which the media object decoded by using the decoded scene description information is rendered by the renderer 116. The $CU_0$ or the $CU_1$ stored in the composition buffer 108 is output to the renderer 116 and then deleted.

The access buffer 110 receives and buffers the encoded media object output from the decoding buffer 102. The access buffer 110 temporarily stores the encoded media object until the renderer 116 completes rendering of the decoded media object. In a related art media player, the encoded media object has been already deleted from the decoding buffer 102 at a time in which the decoded media object is rendered. Thus, a user cannot obtain the encoded media object during reproduction of contents. However, the user may access and obtain the encoded media object stored in the access buffer 110 by using the access buffer 110 of the present invention. The decoded media object may be in a YUV format and the encoded media object may be in a JPG format.

After the access buffer 110 completes buffering of the decoded media object, the encoded media object temporarily stored in the access buffer 110 is deleted.

The control unit 112 receives a user input via the rendering interface 120 while the decoded media object is being rendered by the renderer 116. The user input is for obtaining in real-time the encoded media object at the same time as the reproduction of the contents. When the user input is received, the control unit 112 accesses and obtains the encoded media object stored in the access buffer 110. The obtained encoded media object may be output via the rendering interface 120 according to the user input.

The scene composition unit 114 receives the scene description information decoded by the scene description information decoder 104 and composes a scene related to the media object to be rendered. The received scene description information describes a relationship structure between each of media objects of which a media stream is comprised. The relationship structure (e.g., encoding, a content composition, a rendering order, etc.) between each of the media objects may be defined by using a data structure such as a tree structure. For example, an MPEG-4 system may be embodied in a form whereby an object tree is configured according to time in an object descriptor (OD) framework.

Meanwhile, the scene description information may or may not include region information of the media object. For example, in many cases regarding subtitle information, the scene description information does not include the region information. If the received scene description information includes region information of a media object, a scene is composed according to the region information. However, if the received scene description information does not include the region information of the media object, the scene composition unit 114 composes the scene by using region information pre-determined by a user or determined by using an internal algorithm of the media player.

Also, the scene composition unit 114 receives an identifier, region information, priority order information, and attribute information, which are of the media object, from the rendering map management unit 118. According to the information received from the rendering map management unit 118, the scene composition unit 114 may re-compose the scene so as to re-render the media object modified by a user.

The renderer 116 renders the media object according to the scene composed by the scene composition unit 114. Also, when the rendering map management unit 118 is updated, the renderer 116 re-renders the media object according to the scene re-composed by the scene composition unit 114.

The rendering map management unit 118 generates a rendering map which enables a user to manage a region of the media object by using the rendering interface 120. The rendering map includes information on the region of the media object, which varies according to time.

FIG. 2 is a diagram illustrating an example of a rendering map generated and updated by the rendering map management unit of FIG. 1. The rendering map may include an identifier (e.g., 0x11) of a media object which may be accessed by a user via the rendering interface 120, priority order information (e.g., 5) of the media object, region information (e.g., (20, 50) and (80, 120)) of the media object, and attribute information (e.g., a size of the media object) of the media object.

For example, when video media objects, which are being reproduced via the rendering interface 120, are an astronaut, a dinosaur, and a book, media object identifiers managed by the rendering map may be the astronaut=0x11, the dinosaur=0x12, and the book=0x14. Also, when the video media objects, which are being reproduced, are overlapped, the priority order information means an order of the media objects to be shown to a user. For example, when the priority order of the astronaut is 5 while the priority order of the dinosaur is 2, if the astronaut and the dinosaur overlap on a screen, then the media object shown to the user via the rendering interface 120 is the dinosaur. Also, the region information is information about a region in which the media objects exist. For example, when a region that the astronaut occupies is (20, 50) and (80, 120), this means that the astronaut exists in a region having an x-coordinate from 20 to 50 and a y-coordinate from 80 to 120. However, according to the region information, the media object may be selected only in the shape of a quadrangle. Thus, the rendering map may include not only the region information but also clipping region information. The clipping region information is information about a region excluded from the quadrangle shape. For example, when the clipping region of the astronaut is (20, 30) and (80, 90), a region having an x-coordinate from 20 to 30 and a y-coordinate from 80 to 90 is excluded from the region that the astronaut occupies.

The rendering map of FIG. 2 is described to only include the identifier, the priority order information, the region information, and the clipping region information, which are of the media object. However, the scope of the present invention is not limited thereto but may also include various kinds of information according to exemplary embodiments of the present invention.

The rendering map management unit 118 may generate the rendering map by using the scene description information transferred from the scene composition unit 114 to the renderer 116. That is, if the scene description information includes the identifier, the priority order information, the region information, etc., which are of the media object, the rendering map management unit 118 generates the rendering map by using the scene description information. However, if the scene description information does not include the region information of the media object, the rendering map is generated by using region information which is pre-determined by a user in the scene composition unit 114 or which is determined in the scene composition unit 114 by using an internal algorithm of the media player.

According to the aforementioned description, the identifier, the priority order information, and the region information, which are of the media object that is being reproduced so as to be viewed by a user via the rendering interface 120, are managed by the rendering map management unit 118. Thus, when the user selects a specific media object in the rendering interface 120, the user selected media object may be recognized by using region information of the user selected media object.

Also, the rendering map management unit 118 updates the rendering map based on a user input received via the rendering interface 120. Specifically, the rendering map management unit 118 may update the identifier, the region information, the priority order information, and the attribute information, which are of the media object, based on an input time of the user input and a location of the rendering interface 120 when the user input is received.

For example, if the user moves a location of a media object (e.g., the astronaut) which is being reproduced via the rendering interface 120, the region information of the media object in the rendering map is updated according to time.

The updated region information of the media object is transferred to the scene composition unit 114, the scene composition unit 114 re-composes a scene according to the updated region information, and the renderer 116 renders the updated media object according to the re-composed scene.

Also, the rendering map management unit 118 may manage the rendering map by using a data structure such as a linked list according to the priority order information.

The rendering interface 120 receives a user input, which is input to the media player 100, and outputs data rendered by the renderer 116 to a user.

Figure 4:
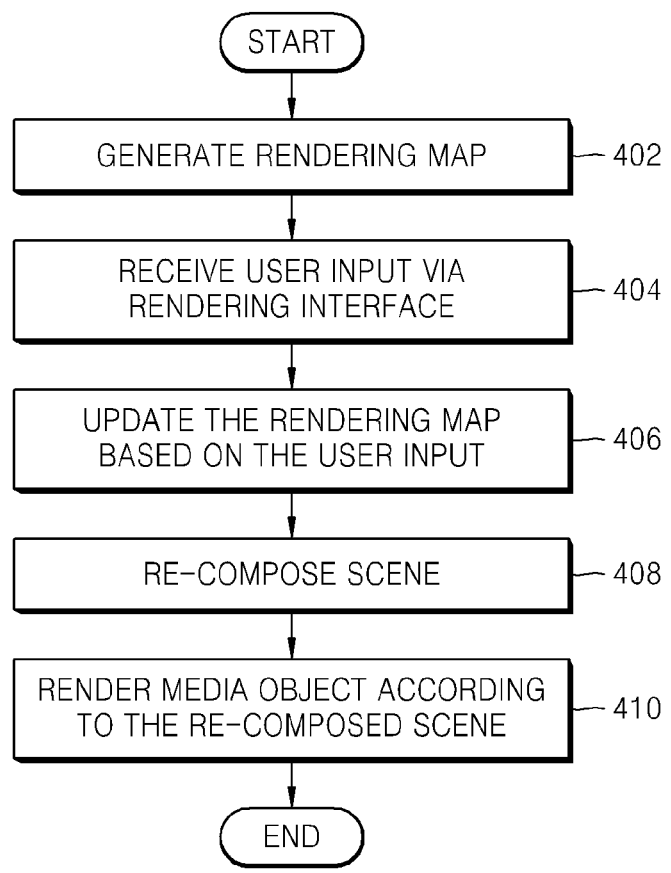
FIG. 4 is a flowchart of a method of manipulating a media object in a media player, according to an exemplary embodiment of the present invention.

FIG. 4 is a flowchart of a method of manipulating a media object in a media player, according to an exemplary embodiment of the present invention.

In operation 402, an apparatus for manipulating a media object generates a rendering map for managing a region of a media object in a rendering interface according to time. The rendering map may include an identifier, region information, priority order information, and attribute information, which are in regard to the media object.

If received scene description information includes the region information, the apparatus for manipulating the media object generates the rendering map by using the region information. If the received scene description information does not include the region information, the rendering map is generated by using region information which is pre-determined by a user or which is determined by using an internal algorithm of the apparatus for manipulating the media object.

Also, the rendering map may be managed by using a data structure such as a linked list according to the priority order information.

In operation 404, a user input is received via the rendering interface.

In operation 406, the rendering map is updated based on the user input. Here, the user input is for obtaining or modifying the media object which is being reproduced in the rendering interface. When the user input is received via the rendering interface, the identifier, the region information, the priority order information, and the attribute information regarding the media object included in the rendering map, are updated based on an input time of the user input and a location of the rendering interface when the user input is received.

In operation 408, a scene is re-composed by using the updated rendering map.

In operation 410, the media object is re-rendered according to the re-composed scene.

Figure 5:
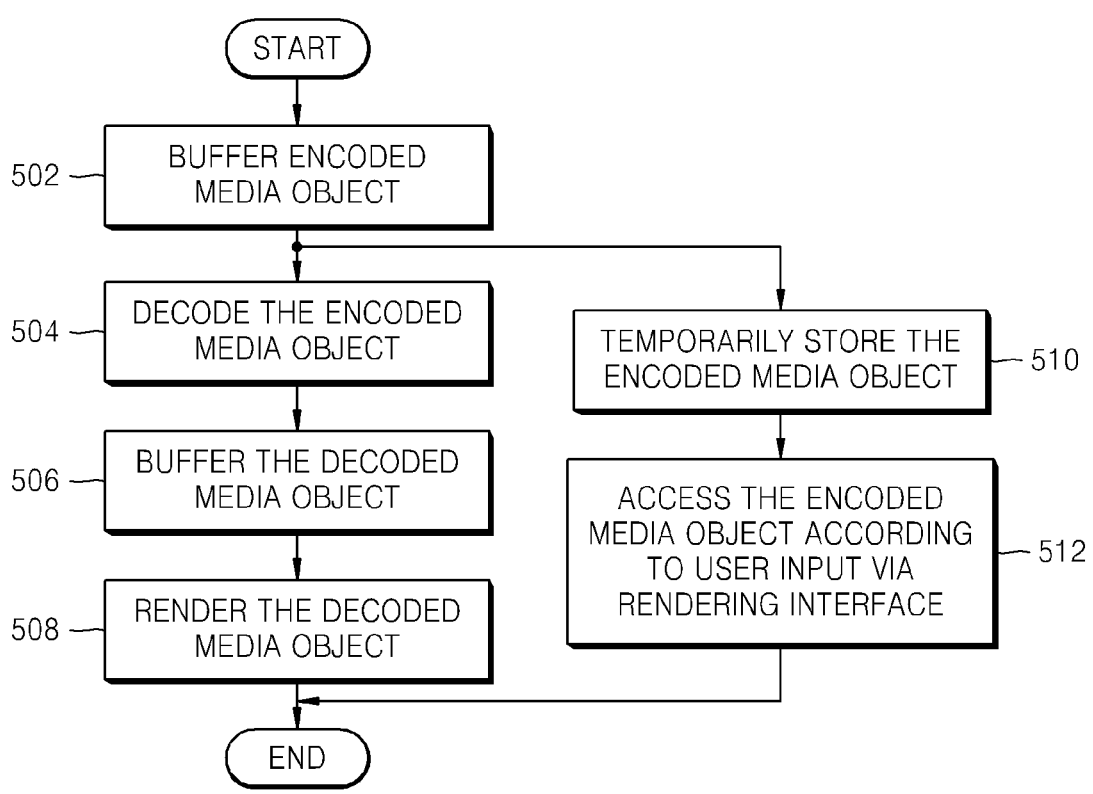
FIG. 5 is a flowchart of a method of manipulating a media object in a media player, according to another exemplary embodiment of the present invention.

FIG. 5 is a flowchart of a method of manipulating a media object in a media player, according to another exemplary embodiment of the present invention.

In operation 502, a decoding buffer buffers an encoded media object. The buffered encoded media object is transferred to a media decoder, and the encoded media object stored in the decoding buffer is deleted.

In operation 504, the media decoder decodes the buffered encoded media object. For example, in the case of a video media object, a media object having a JPG format may be decoded to obtain a media object having a YUV format.

In operation 506, a composition buffer buffers the media object resulting from the decoding by the media decoder.

In operation 508, the decoded media object output from the composition buffer is rendered by a renderer.

In operation 510, while operations 504 through 508 are performed, an access buffer temporarily stores the encoded media object. After a renderer completes rendering of the media object, the access buffer deletes the encoded media object.

In operation 512, while the decoded media object is being rendered, a control unit accesses the access buffer according to a user input via the rendering interface, thereby obtaining the encoded media object.

FIG. 6 is a flowchart of a method of manipulating a media object in a media player, according to another exemplary embodiment of the present invention.

In operation 602, if scene description information of an original media object is modified, the method proceeds to operation 604. If not modified, the method ends.

In operation 604, when the scene description information of the original media object is modified by a user input via a rendering interface, the media player divides a rendering region of the rendering interface into a rendering region of the original media object and a rendering region of a modified media object. For example, the modification of the scene description information may be performed by the rendering map update process which was described above in relation to FIG. 4 but the modification is not limited thereto.

In operation 606, the media player renders the original media object in the rendering region of the original media object and renders the modified media object in the rendering region of the modified media object. The modified media object (including metadata thereof may be temporarily stored in a memory of the media player or in a temporary storage region of a media file.

The original media object and the modified media object may be rendered via the rendering interface at the same time but may also be rendered at different times.

In operation 608, when the modification of the media object (including metadata thereof) performed by a user is completed, the user may select the rendering region of the original media object or the rendering region of the modified media object. When one of the rendering region of the original media object and the rendering region of the modified media object is selected according to a user input, the method proceeds to operation 610. If not selected, the method returns to the beginning of operation 608.

In operation 610, according to the user input for selecting one of the rendering region of the original media object and the rendering region of the modified media object, the media player displays only the selected rendering region in the rendering region of the rendering interface. The non-selected rendering region is deleted from the rendering interface, and only the selected rendering region is shown to the user.

A media object (including metadata thereof) which is not selected by the user may be deleted from the memory of the media player. For example, when the modified media object is selected by the user, metadata of the original media object may be updated to metadata of the modified media object. Also, when the original media object is selected by the user, the metadata of the modified media object may be deleted from the memory.

According to the current exemplary embodiment, when content is modified in the rendering interface of the media player, a separate rendering region is automatically generated. When a user completes or cancels the modification, modified data is updated or deleted and the rendering interface is automatically transformed so as to have only one rendering region.

The present invention may be applied to media metadata frameworks such as an MPEG-4 system (ISO/IEC 14496-1) and an MPEG-4 LASeR/SAF system (ISO/IEC 14496-20), media player frameworks such as a Windows media player (Microsoft Corp.), a QuickTime player (Apple Inc.), and a RealMedia player (RealNetworks Inc.) which support a media data storage format (a media file format), and to media manipulating terminals such as a television (TV), a set-top box (STB), a portable multimedia player (PMP), a MPEG Audio Layer-3 (MP3), a mobile broadcasting terminal, and a mobile phone which support a media system (frameworks, file formats, etc.).

Also, a program for executing the method of manipulating the media object in the media player according to the invention can be exemplarily embodied as computer readable codes on a computer readable recording medium. The computer readable recording medium is any data storage device that can store programs or data which can be thereafter read by a computer system. Examples of the computer readable recording medium include read-only memory (ROM), random-access memory (RAM), CD-ROMs, magnetic tapes, hard disks, floppy disks, flash memory, and optical data storage devices, among others. The computer readable recording medium can also be distributed over network coupled computer systems so that the computer readable code is stored and executed in a distributed fashion.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of manipulating a media object in a media player, the method comprising:
    generating a rendering map for managing a region of the media object in a rendering interface according to time and based on scene description information;
    receiving a user input via the rendering interface;
    updating the rendering map based on the user input;
    re-composing a scene based on the updated rendering map; and
    rendering the media object according to the re-composed scene,
    wherein the region of the media object comprises information about a region in which the media object exists, and
    wherein the generating the rendering map comprises:
        determining if the region information exists in the scene description information,
        extracting the region information from the scene description information when the region information exists in the scene description information, and
        using a value pre-determined by a user for the region information or a value determined by an internal algorithm when the region information does not exist in the scene description information.

2. The method of claim 1, wherein the rendering map comprises at least one of an identifier, the region information, priority order information, and attribute information regarding the media object.

3. The method of claim 2, wherein the updating of the rendering map comprises updating at least one of the identifier, the region information, the priority order information, and the attribute information regarding the media object, based on an input time of the user input and a location of the rendering interface when the user input is received.

4. The method of claim 2, wherein the rendering map is managed by using a data structure comprising a linked list according to the priority order information.

5. The method of claim 1, wherein the region of the media object is in a shape of a quadrangle and further comprises clipping region information which is information about a region excluded from the region in which the media object exists.

6. The method of claim 1, wherein the media object being manipulated is an encoded media object obtained during the rendering of the scene.

7. The method of claim 1, wherein the rendered scene comprises rendering of decoded media objects and during the rendering, an encoded media object corresponding to one of the decoded media objects is obtained for user manipulation.

8. The method of claim 1, wherein after the media object is decoded, rendering the media object in a decoded format while storing the media object being rendered in an encoded format in a storage until the rendering of the media object is completed and wherein the rendering map is generated, optionally with the value predetermined by the user, prior to further manipulations by the user of the media object.

9. A method of manipulating a media object in a media player, the method comprising:
    dividing a rendering region of a rendering interface into a rendering region of an original media object and a rendering region of a modified media object if scene description information regarding the original media object is modified according to a user input via the rendering interface;
    rendering the original media object in the rendering region of the original media object and rendering the modified media object in the rendering region of the modified media object; and
    displaying only a selected rendering region in the rendering region of the rendering interface according to a user input for selecting one of the rendering region of the original media object and the rendering region of the modified media object,
    wherein the rendering region of the original media object and the rendering region of the modified media object each comprises information about a region in which the respective media object exists,
    wherein while rendering the original media object, a rendering map is generated from the scene description information for rendering the modified media object,
    wherein the method further comprises extracting the region information from the scene description information for the rendering map when the region information exists in the scene description information, and
    wherein the method further comprises using the region information for the rendering map pre-determined by a user or determined via an internal algorithm when the region information does not exist in the scene description information.

10. The method of claim 9, wherein the displaying further comprises updating metadata of the original media object to metadata of the modified media object, or deleting the metadata of the modified media object.

11. The method of claim 9, wherein, in the rendering, the original media object and the modified media object are rendered simultaneously.

12. The method of claim 9, wherein, in the rendering, the original media object and the modified media object are rendered at different times.

13. An apparatus for manipulating a media object in a media player, the apparatus comprising:
    a memory of the media player configured to store the media object;
    a rendering interface which receives a user input;
    a rendering map management unit which generates a rendering map for managing a region of the media object in the rendering interface according to time and based on scene description information, and updates the rendering map based on the user input received via the rendering interface;
    a scene composition unit which re-composes a scene based on the updated rendering map; and
    a renderer which renders the media object according to the re-composed scene, wherein the region of the media object comprises information about a region in which the media object exists, wherein the rendering map management unit determines if the region information exists in the scene description information, and wherein, based on said determination, the rendering map management unit extracts the region information from the scene description information when the region information exists in the scene description information and uses a value pre-determined by a user or determined by an internal algorithm for the region information when the region information does not exist in the scene description information.

14. The apparatus of claim 13, wherein the rendering map comprises at least one of an identifier, the region information, priority order information, and attribute information regarding the media object.

15. The apparatus of claim 14, wherein the rendering map management unit updates at least one of the identifier, the region information, the priority order information, and the attribute information regarding the media object, based on an input time of the user input and a location of the rendering interface when the user input is received.

16. The apparatus of claim 14, wherein the rendering map management unit manages the rendering map using a data structure comprising a linked list according to the priority order information.

17. A non-transitory computer readable recording medium having recorded thereon a program for executing a method of manipulating a media object in a media player, the method comprising:

generating a rendering map for managing a region of the media object in a rendering interface according to time and based on scene description information;

receiving a user input via the rendering interface;

updating the rendering map based on the user input;

re-composing a scene based on the updated rendering map; and rendering the media object according to the re-composed scene, wherein the region of the media object comprises information about a region in which the media object exists, wherein the generating the rendering map comprises:

determining if the region information exists in the scene description information, extracting the region information from the scene description information when the region information does not exist in the scene description information, and using a value pre-determined by a user or determined via an internal algorithm for the region information when the region information exists in the scene description information.

* * * * *